United States Patent [19]

Hudson

[11] Patent Number: 5,252,806
[45] Date of Patent: Oct. 12, 1993

[54] ADAPTER PLATE FOR INCREASING THE EFFECTIVE WIDTH OF A CARPET IRON

[76] Inventor: David A. Hudson, 2325 Highway 60 West, Lake Wales, Fla. 33853

[21] Appl. No.: 792,151

[22] Filed: Nov. 11, 1991

[51] Int. Cl.$^5$ .............. H05B 1/00; D06F 75/38; D06F 75/30
[52] U.S. Cl. .............................. 219/245; 38/75; 38/81; 38/93; 38/97; 219/228
[58] Field of Search .............. 219/245-259; 38/82, 75, 80, 81, 93, 97

[56] References Cited

U.S. PATENT DOCUMENTS

| Re. 23,736 | 11/1953 | Helmbold | 219/249 |
|---|---|---|---|
| 32,304 | 5/1861 | McClure | 38/97 |
| 168,937 | 10/1875 | Thebaud | 38/97 |
| 648,917 | 5/1900 | Bradley | 38/97 |
| 920,569 | 5/1909 | Hegarty et al. | 219/249 |
| 1,858,250 | 5/1932 | Smith | 38/97 |
| 2,118,820 | 5/1938 | Paysee | 38/93 |
| 2,200,557 | 5/1940 | Kuhn et al. | 219/228 X |
| 2,299,322 | 10/1942 | Harter | 219/228 X |
| 2,637,125 | 5/1953 | Roberts | 219/245 X |
| 2,738,603 | 3/1956 | Towne | 38/97 |
| 2,902,576 | 9/1959 | Miller | 219/245 |
| 3,523,176 | 8/1970 | Hill | 219/245 |
| 4,829,157 | 5/1989 | Loyd | 219/245 X |

Primary Examiner—Anthony Bartis
Attorney, Agent, or Firm—Pettis & McDonald

[57] ABSTRACT

A carpet iron adapter plate of the type primarily intended for attachment to the sole plate of a carpet iron for extending the working surface of the iron so that wider carpet tape can be used. The adapter plate comprises a base having a top surface and a bottom surface, the top surface has a recessed portion formed therein that is configured to receive at least a portion of the sole plate of the carpet iron therein. The adapter plate has at least two arms attached to the top surface of the base, each arm having first and second ends. The first end of one of the arms is attached proximal to one edge of the base and the first end of another one of the arms is attached proximal to an opposing edge of the base. The second ends of the arms extend upwardly and inwardly in relation to the base so that when the carpet iron is inserted in the adapter plate portions of each of the arms overlie and are spaced apart from a top surface of the carpet iron to prevent overheating of the carpet backing and the second ends of the arms engage d top surface of the carpet iron for removably attaching the adapter plate to the carpet iron.

8 Claims, 2 Drawing Sheets

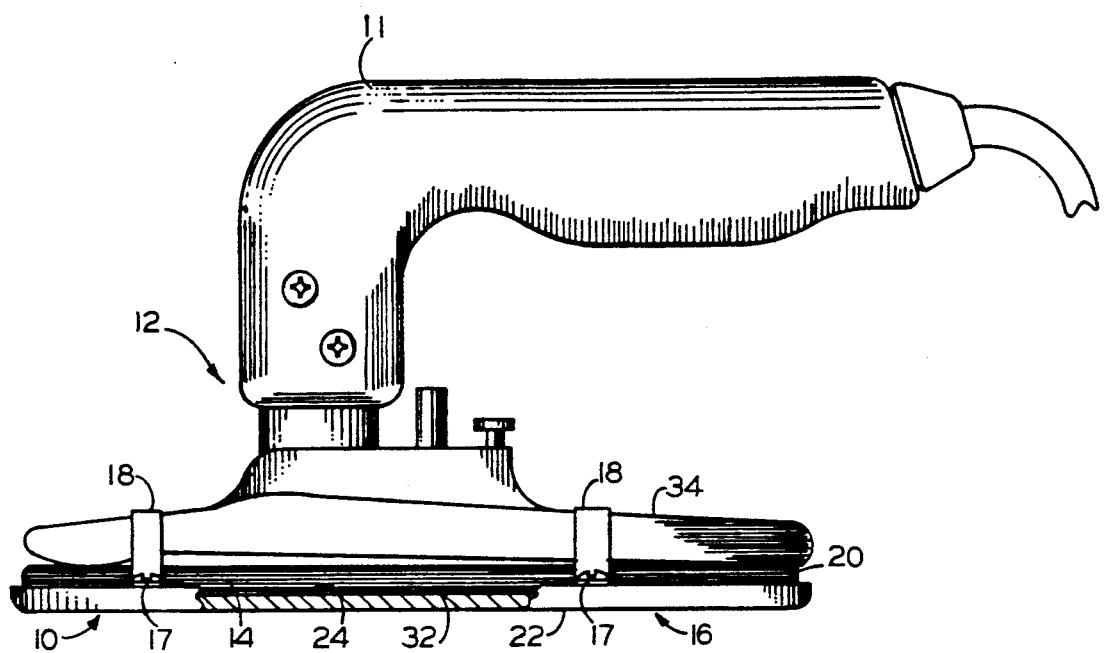
Fig_1_
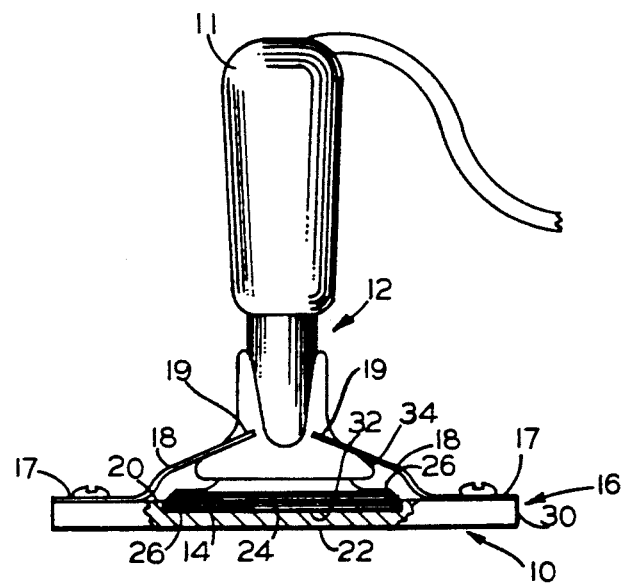
Fig_2_

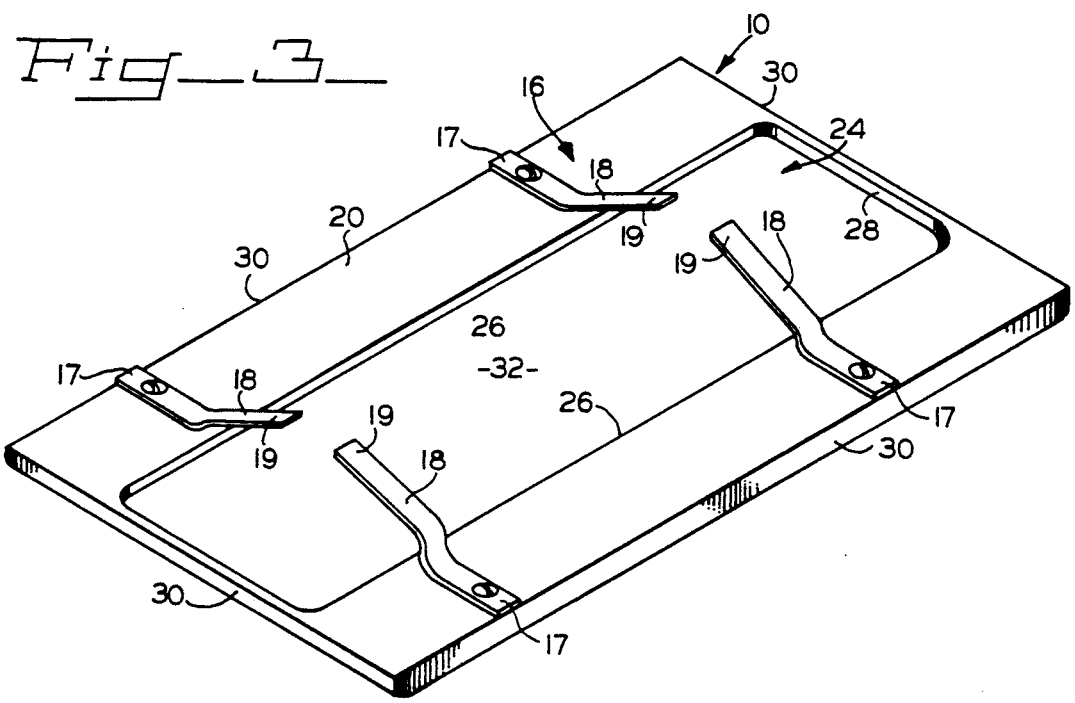

ADAPTER PLATE FOR INCREASING THE EFFECTIVE WIDTH OF A CARPET IRON

BACKGROUND OF THE INVENTION

1. Field of Invention

The present invention relates to carpet irons used to join the abutted edges of the backing of two pieces of carpeting by attaching a preglued strip to the carpet backing. More specifically, the invention is an attachment for such a carpet iron that increases the effective size of the sole plate of the carpet iron.

2. Description of the Prior Art.

Carpet irons are used to join two separate pieces of carpet whose backing abuts one another along their edges. A strip of tape having a surface with solidified glue attached is placed under the two pieces of carpeting with the glued side placed adjacent to the carpet backing. The sole plate of a seaming iron is inserted between the tape and the abutting carpet edges that are to be joined. The sole plate of the seaming iron is heated to a temperature that melts the glue for a quick and firm attachment to the carpet backing. The carpet iron is moved along the carpet joint at a speed that leaves the glue in the proper molten state to bond properly with the carpet backing, creating a strong and nearly invisible seam between the abutting pieces of carpeting. Seaming tape is manufactured in various sizes requiring irons with sole plates of different widths to melt the glue attached to the pre-glued tape properly.

The two most common sizes of carpet irons are those with sole plates that are three inches and six inches wide, respectively. Carpet seaming irons similar to those disclosed in U.S. Pat. No. 3,523,176, issued to H. J. Hill and U.S. Pat. No. 3,927,298, issued to E. F. Prater are well known in the art. The patent to Hill also discloses a stand for supporting the iron when not in use, thereby keeping the hot sole plate away from the carpet surface. Persons who lay carpets currently must buy two carpet irons to have the flexibility of utilizing the different widths of tape.

There is a need for a means to convert a three inch carpet iron to a six inch carpet iron to avoid the cost of having two irons for carpet seaming. Such an invention would also provide those carpet layers that have a six inch carpet iron with an inexpensive backup iron.

SUMMARY OF THE INVENTION

The current invention, a carpet iron adapter plate, provides a means for converting a carpet seaming iron used to seam with narrow tapes to one capable of seaming with wider tapes, for example, converting a three inch carpet seaming iron to a six inch seaming iron. Not only does the adapter plate reduce the amount of equipment needed on hand and the expense related to it, the adapter plate also provides additional benefits.

Overheating of the carpet backing itself is undesirable as it may cause ridges or raised portions in the finished carpeting, often known as "peaking." One of the common carpet backings is made from polypropylene. If the polypropylene backing becomes too hot, it swells becoming thicker than the rest of the backing. This extra thickness causes a ridge, or raised portion, that is visible after the carpet is laid. The body of a six inch iron typically extends outwardly to a point adjacent to the edges of the sole plate. The surfaces of this portion of the carpet iron body frequently are very hot; so hot that when the carpet iron is placed under the carpet, and the carpet backing makes contact with these hot areas, the backing overheats causing swelling or peaking. Use of the carpet iron adapter plate reduces the amount of carpet backing exposed to the hot portions of the body surfaces of the carpet.

The adapter plate comprises a base, having a top surface and a bottom surface, and an attaching means for attaching the adapter plate to the carpet iron. The top surface has a recessed portion formed therein that is dimensioned and configured to receive at least a portion of the sole plate of the carpet iron. The heat is transferred from the sole plate to the recessed portion of the top surface of the adapter plate and then to the larger bottom surface of the adapter plate. The adapter plate is sized to heat a wider carpet tape than can normally be heated by the carpet iron.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a side elevational view of a preferred embodiment of the on adapter plate, with a portion of the base broken away, illustrating the insertion of the carpet iron therein;

FIG. 2 is a front elevational view of a preferred embodiment of the invention with a portion of the base broken away, illustrating the insertion of the carpet iron therein; and FIG. 3 is a perspective view of a preferred embodiment of the carpet iron adapter plate.

Similar reference characters refer to similar parts throughout the several views of the drawings.

DETAILED DESCRIPTION

A preferred embodiment for the carpet iron adapter plate of this invention is illustrated in the drawing FIGS. 1-3 and is identified generally as 10. A typical carpet iron may conveniently have the form shown in FIGS. 1 and 2 and is generally identified as 12. The typical carpet iron 12 includes a handle 11, a top surface 34, and a sole plate 14 that is heated by the carpet iron 12 for melting the glue on pre-glued carpet tape (not shown). The adapter plate 10, as best seen in FIG. 3, comprises a base 16 and attaching means, conveniently arms 18. The base 16 comprises a top surface 20, a bottom surface 22 and a recess 24. The recess 24 has a first pair of opposing sides 26 and a second pair of opposing sides 28, as best shown in FIG. 3. In the preferred embodiment, the base 16 is comprised of four edges 30 that are generally at right angles with one another, and each edge is generally parallel to either the sides 26 or the sides 28.

At least two arms 18 are attached proximal to two opposing edges 30 of the adapter plate 10, each extending inwardly in relation to the edges 30. In the preferred embodiment, there are four arms 18, each arm having a first end 17 and a second end 19, the first end 17 being attached to the top surface 20 of the base 16 and each second end 19 extending upwardly and inwardly in relation to the base 16. When the carpet iron 12 is inserted in the carpet iron adapter plate 10, a portion of each second end 19 of each arm overlies and is spaced from the top surface 34 of the carpet iron proximal the handle to prevent overheating of the carpet backing and the second ends 19 of the arm 18 engage the top surface of the iron for attaching the adapter plate to the iron. The arms 18 generally oppose a corresponding one of the arms 18 attached to the other opposing side 26.

The bottom surface 32 of the recess 24 is dimensioned and configured so that at least a portion of the sole plate 14 of a typical carpet iron 12 may be received by the recess 24. In the preferred embodiment, the bottom surface 32 of the recess 24 is dimensioned to receive all of the sole plate 14 of the typical carpet iron 12, as shown in FIGS. 1 and 2.

The carpet iron adapter plate 10, in the preferred embodiment, is constructed of aluminum, as aluminum efficiently conducts heat, is inexpensive and is light in weight. However, the adapter plate 10 may be constructed of any other suitable heat conductive material. The preferred embodiment of the adapter plate 10 is sized and configured to fit the standard three inch carpet iron 12; however, the adapter plate 10 may be sized and configured to fit carpet irons 12 having sole plates 14 with other dimensions.

Having thus set forth a preferred construction for the carpet iron adapter plate 10 of this invention, it is to be remembered that this is but a preferred embodiment. Attention is now invited to a description of the use of the adapter plate 10. In the typical case, a three inch iron 12 is inserted into a compatible adapter plate 10 by placing the iron 12 so that the sole plate 14 is located over the recess 24 and thus over the arms 18. The iron 12 is pushed downward causing the arms 18 to spring aside and then spring back over the top surface 34 of the carpet iron 12, as shown in FIGS. 1 and 2. The sole plate 14 of the carpet iron 12 is then heated. The heat is then transferred to the bottom surface, 32 of the recess 24 and thus, to the bottom surface 20 of the base 16 and to the tape (not shown). It will thus be seen that the objects set forth above, among those made apparent from the preceding description, are efficiently attained, and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A carpet iron adapter plate of the type primarily intended for attachment to the bottom surface of the sole plate of a carpet iron, said adapter plate comprising:

a base having a top surface, a bottom surface, and four edges, said top surface including a recessed portion formed therein, said recessed portion being dimensioned and configured to receive at least a portion of the sole plate of a carpet iron therein; and at least two arms, each having a first and a second end, said first end of one of said at least two arms being attached to said top surface of said base proximal to one of said four edges of said base and another of said at least two arms being attached to said top surface of said base proximal to an opposing one of said four edges, said second ends of each of said at least two arms extending upwardly and inwardly in relation to said base such that when at least a portion of the sole plate of the carpet iron is inserted in said recess of said adapter plate, portions of said at least two arms overlie and are spaced apart from a top surface of the carpet iron, and said second ends of said at least two arms engage a top surface of the carpet iron for removably attaching said adapter plate to the carpet iron.

2. A carpet iron adapter plate as in claim 1 wherein said recess comprises a first and a second pair of opposing sides.

3. A carpet iron adapter plate as in claim 2 wherein said sides of said recess that are adjacent are generally at right angles to one another.

4. A carpet iron adapter plate as in claim 2 wherein said top surface extends laterally outwardly from each side of said first pair of opposing sides of said recess a greater distance than said top surface extends laterally outwardly from said second pair of opposing sides of said recess.

5. A carpet iron adapter plate as in claim 2 wherein said first pair of sides of said recess are longer than said second pair of sides of said recess.

6. A carpet iron adapter plate as in claim 2 wherein said base comprises four edges with adjacent edges at generally right angles to one another.

7. A carpet iron adapter plate as in claim 1, wherein an even number of arms are provided and said arms generally opposed one another in pairs.

8. A carpet iron adapter as in claim 1 wherein said recess has a bottom surface, said recess being dimensioned and configured so that when the sole plate of the carpet iron is received by said recess in said adapter plate said bottom surface of said recess contacts all of the bottom surface of the sole plate of the carpet iron.

* * * * *

UNITED STATES PATENT AND TRADEMARK OFFICE
CERTIFICATE OF CORRECTION

PATENT NO. : 5,252,806
DATED : October 12, 1993
INVENTOR(S) : David A. Hudson

It is certified that error appears in the above-identified patent and that said Letters Patent is hereby corrected as shown below:

On the Title Page, Item [57];

Line 19, delete "d" and insert therefor -- a --;

Claim 6, column 4, line 42, delete "2" and insert therefor -- 1 --.

Signed and Sealed this

Tenth Day of May, 1994

Attest:

BRUCE LEHMAN

Attesting Officer    Commissioner of Patents and Trademarks